United States Patent [19]

Danko

[11] Patent Number: 5,325,174
[45] Date of Patent: Jun. 28, 1994

[54] INTEGRATED OPTIC GYRO WITH ONE BRAGG TRANSDUCER

[75] Inventor: Joseph J. Danko, Franklin, Mass.

[73] Assignee: Northrop Corporation, Los Angeles, Calif.

[21] Appl. No.: 903,622

[22] Filed: Jun. 23, 1992

[51] Int. Cl.$^5$ ............................................. G01C 19/72
[52] U.S. Cl. ..................................................... 356/350
[58] Field of Search ........................................... 356/350

[56] References Cited

U.S. PATENT DOCUMENTS

| | | | |
|---|---|---|---|
| 4,274,742 | 6/1981 | Lustig | 356/350 |
| 4,326,803 | 4/1982 | Lawrence | 356/350 |
| 4,445,780 | 5/1984 | Burns | 356/350 |
| 4,456,377 | 6/1984 | Shaw et al. | 356/350 |
| 4,480,915 | 11/1984 | Arditty et al. | 356/350 |
| 4,514,088 | 4/1985 | Coccoli | 356/350 |
| 4,588,296 | 5/1986 | Cahill et al. | 356/350 |
| 4,661,964 | 4/1987 | Haavisto | 372/94 |
| 4,674,881 | 6/1987 | Lawrence et al. | 356/350 |
| 4,747,111 | 5/1988 | Trutna, Jr. et al. | 372/94 |
| 4,786,172 | 11/1988 | Zomick | 356/350 |

FOREIGN PATENT DOCUMENTS

58-200108 11/1983 Japan ..................................... 356/350

*Primary Examiner*—Vincent P. McGraw
*Attorney, Agent, or Firm*—Terry J. Anderson; Robert B. Block; Karl J. Hoch, Jr.

[57] ABSTRACT

A laser gyroscope is provided that utilizes a single frequency shifter, in the form of a Bragg cell, to adjust the frequencies of counter-rotating optical signals in a thin film waveguide to achieve resonance along the optical path encountered by each of the signals. The system also utilizes two voltage to frequency convertors, each of which outputs an RF signal to a respective frequency shifter. Each voltage to frequency convertor is modulated by a modulation signal that includes a DC component and an RF signal. The single frequency shifter approach results in fewer required components for proper operation of the thin film laser gyroscope. Redundant back-up components can be added to the gyroscope to guard against the event of a component failure. Alternately, the laser gyroscope is inherently more tolerable of low fabrication yield because of the redundancies.

22 Claims, 6 Drawing Sheets

INTEGRATED OPTIC GYRO WITH ONE BRAGG TRANSDUCER

FIELD OF THE INVENTION

This invention relates to inertial instruments, and more particularly, to laser gyroscopes.

BACKGROUND OF THE INVENTION

Commonly assigned U.S. Pat. No. 4,326,803, issued Apr. 27, 1982 describes thin film laser gyroscopes, also known as micro-optic gyroscopes (MOGs). Therein, a Sagnac effect is said to define a linear relationship between the rate of rotation of a circular waveguide, or loop, and the difference in frequency in oppositely directed electromagnetic wave disturbances travelling through that waveguide at resonance.

In U.S. Pat. No. 4,326,803 issued Apr. 27, 1982, entitled "Thin Film Laser Gyro" to Lawrence there is described a thin film, passive waveguide that provides a substantially closed circular propagation path for optical signals. A laser and associated beam splitter are adapted to generate two coherent optical signals. Directional couplers introduce the two optical signals to the waveguide in a manner establishing oppositely directed coherent optical signals in the waveguide. In one embodiment, both optical signals are frequency-controlled so that these signals resonate within the waveguide. Frequency control for the optical signals may be achieved by the use of acousto-optic modulators, such as Bragg cells, which shift the frequency of applied optical signals as a function of a frequency of a radio frequency (RF) signal applied to the modulator. With this configuration, the optical signals from a laser and a beam splitter pass along separate paths, through the frequency shifters, directional couplers, and into the waveguide. In addition, optical detectors and associated directional couplers are adapted to detect the intensity of the oppositely-directed optical signals in the waveguide. Servo networks responsive to the detectors generate the RF signals for controlling the frequencies of the optical signals (by way of the modulators) that are injected into the waveguide in their respective directions.

In commonly assigned U.S. Pat. No. 4,674,881, issued Jun. 23, 1987, entitled "Open Loop Thin Film Laser Gyro" to Lawrence et al, there is described a laser gyro that includes a laser and a ring resonator. Here, one servo only allows open-loop performance. Coupling apparatus is provided for coupling counter-propagating beams of light from the laser into the resonator. The frequency of the laser is scanned across the resonance frequency of the resonator in steps superimposed on a direct current level, and the intensity of light in one of the counter-propagating beams is detected during the steps. Apparatus is provided for determining the difference in intensity of this detected light during the steps. Electronics responsive to this difference is used to alter the DC level of the steps to drive the difference to zero. The intensity of light in the other of the counter-propagating beams is then detected during the steps and the difference in intensity is determined for this beam. This difference is indicative of the rotation rate of the gyro.

In commonly assigned U.S. Pat. No. 4,661,964, issued Apr. 28, 1987, entitled "Resonant Waveguide Laser Gyro With A Switched Source" to Haavisto there is described a passive ring resonator laser gyro. The gyro includes a semiconductor laser diode which is switched between two frequencies. The output of the laser diode is coupled into a branching waveguide. The light in this branching waveguide is coupled to a resonant ring waveguide so as to excite counter-propagating beams which are sampled by detectors monitoring the output of waveguides coupled to the ring waveguide. The laser current is switched at a fixed rate between two values corresponding to the resonant frequencies of the two directions of propagation in the waveguide ring. The current values are determined by a resonance tracking servo system. This device functions, electronically, in an open loop manner.

In U.S. Pat. No. 4,274,742, issued Jun. 23, 1981, entitled "Passive Ring Laser Rate of Turn Devices", to Lustig, there is described a ring laser having a passive resonator for the propagation of clockwise and counterclockwise beams of electromagnetic energy. The clockwise and counterclockwise resonant frequencies are oscillated between respective first and second distinct values. A detector is provided for producing signals with amplitudes indicative of the amplitudes of the first and second beams. Circuitry is coupled to the detector means for producing a rotation rate signal proportional to the algebraic combination of the signals indicative of the amplitudes of the first and second beams. By dispensing with closed-loop feedback arrangements to provide an output signal indicative of rotation rate, the ring laser provides very rapid response to changes in the rotation rate of the passive resonator and is thus well adapted for use with high speed data processors. The clockwise and counterclockwise resonant frequencies need not be adjusted precisely to the frequency of either counter-rotating beam.

Accordingly, it is an object of the present invention to provide an improved passive ring resonator laser gyro that utilizes a single frequency shifter and that operates, electronically, in a closed-loop manner.

It is another object of the invention to provide a thin film laser gyroscope that is less complex to manufacture, thereby increasing the device yield and decreasing manufacturing costs.

SUMMARY OF THE INVENTION

The laser gyro of the present invention is an improvement upon the laser gyro described in commonly assigned U.S. Pat. No. 4,326,803 issued Apr. 27, 1982, entitled "Thin Film Laser Gyro" to Lawrence. As was previously described, the laser gyro described in that patent utilizes two frequency shifters, in the form of Bragg cells, to adjust the frequencies of the counter-rotating optical signals in a waveguide to achieve resonance along the optical path encountered by each of the signals. The laser gyro of Lawrence also utilizes two voltage to frequency convertors, each of which outputs an RF signal to a respective frequency shifter. A DC voltage is fed to each voltage to frequency convertor.

The thin film laser gyro of the present invention utilizes a single frequency shifter, in the form of a Bragg cell, to accomplish the same purpose as the two frequency shifters in U.S. Pat. No. 4,326,803. The thin film laser gyro of the present invention utilizes two voltage to frequency converters, wherein the respective converter input signals include a DC component and an RF signal.

The single frequency shifter approach of the present invention results in fewer components to obtain proper operation of the laser gyroscope.

Therefore, redundant back-up components can be added to the gyroscope to guard against the event of component failure, and to provide greater tolerance of less than optimum fabrication yields.

BRIEF DESCRIPTION OF THE DRAWINGS

The above set forth and other features of the invention will be made more apparent in the ensuing detailed description of the invention when read in conjunction with the attached drawing, wherein.

DETAILED DESCRIPTION OF THE INVENTION

Figure 1:
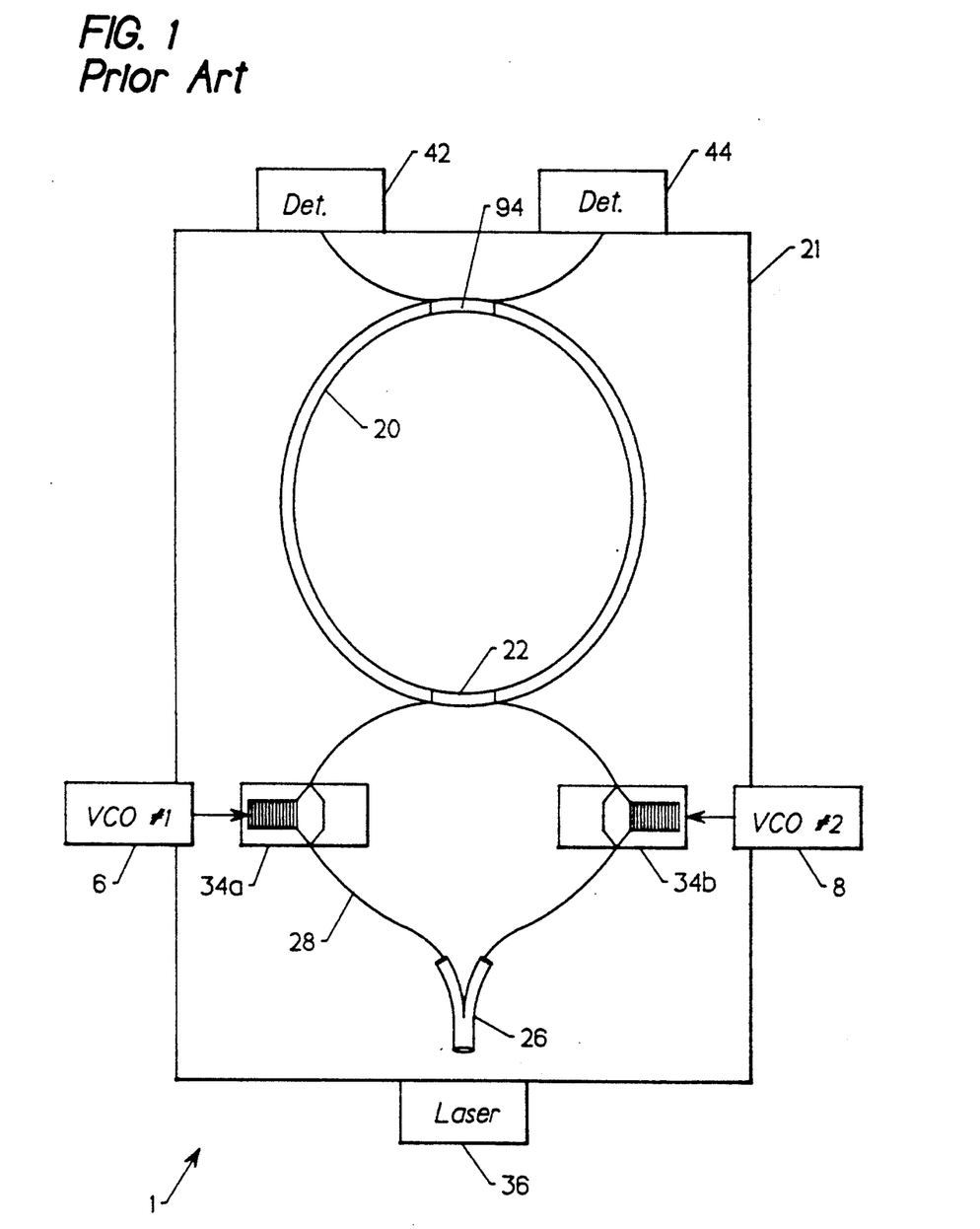
FIG. 1 shows the basic configuration of the laser gyro of the prior art utilizing two frequency shifters.

FIG. 1 shows the laser gyro 1 of the prior art which is the subject matter of commonly assigned U.S. Pat. No. 4,326,803. The gyro 1 includes a thin film, dielectric waveguide 20 defining a circular, closed propagation path for optical signals. The circular waveguide 20 is disposed on planar substrate 21. A controllable frequency laser 36 is also disposed on substrate 21. Two frequency shifters 34a and 34b are utilized and each receives an RF signal from voltage-controlled oscillators (VCOs) 6 and 8 respectively.

Figure 3:
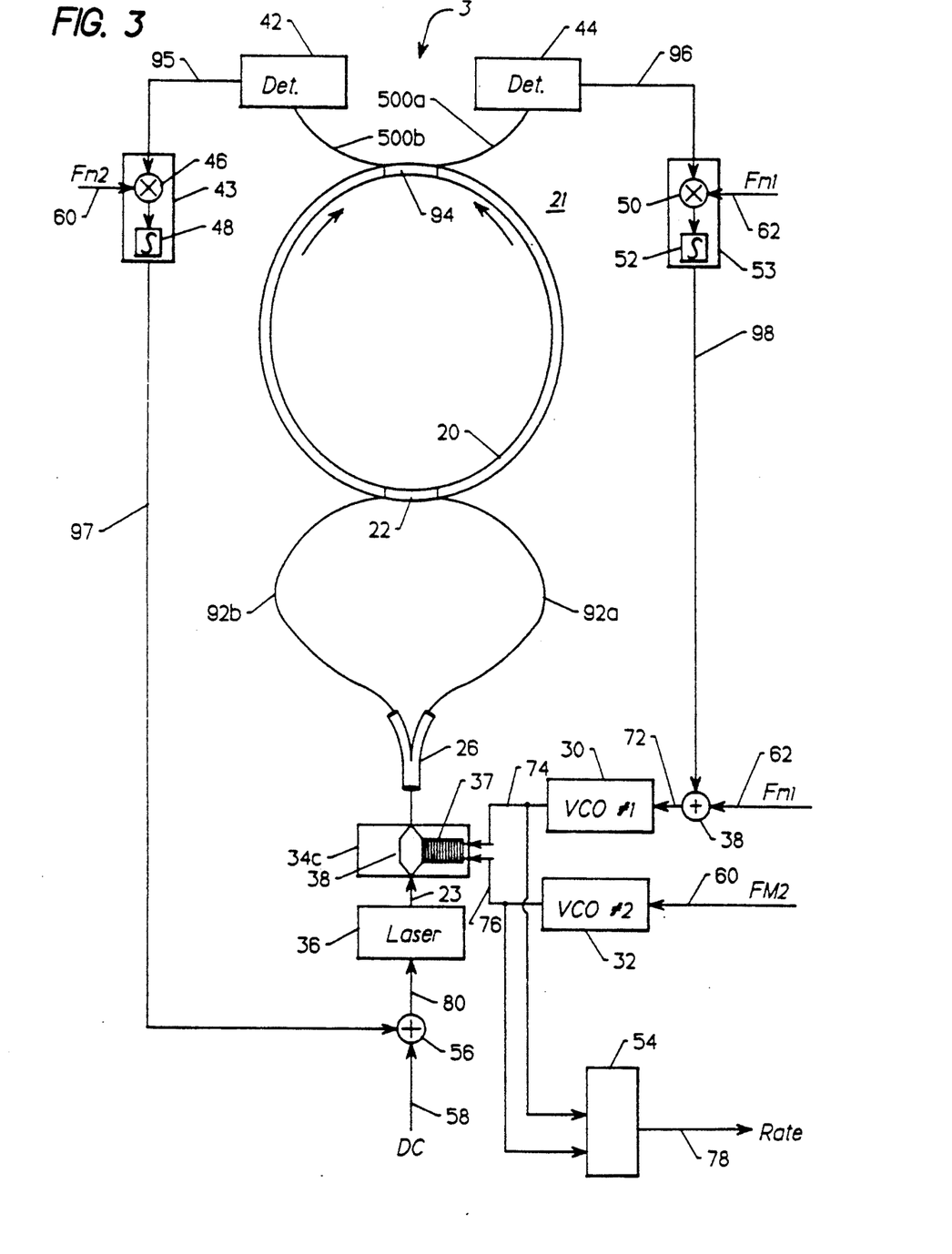
FIG. 3 shows the laser gyro of the present invention.

FIG. 3 shows the laser gyro 3 of the present invention. Waveguide 20 is a thin film, passive ring waveguide providing a closed, passive propagation path for optical signals. Waveguide 20 is disposed on a planar substrate 21. Controllable frequency laser 36 generates a coherent light beam through waveguide 23. Waveguide 38 represents a tapered section of waveguide 23. The frequency of laser 36 is controlled by control signal 80.

Figure 2:
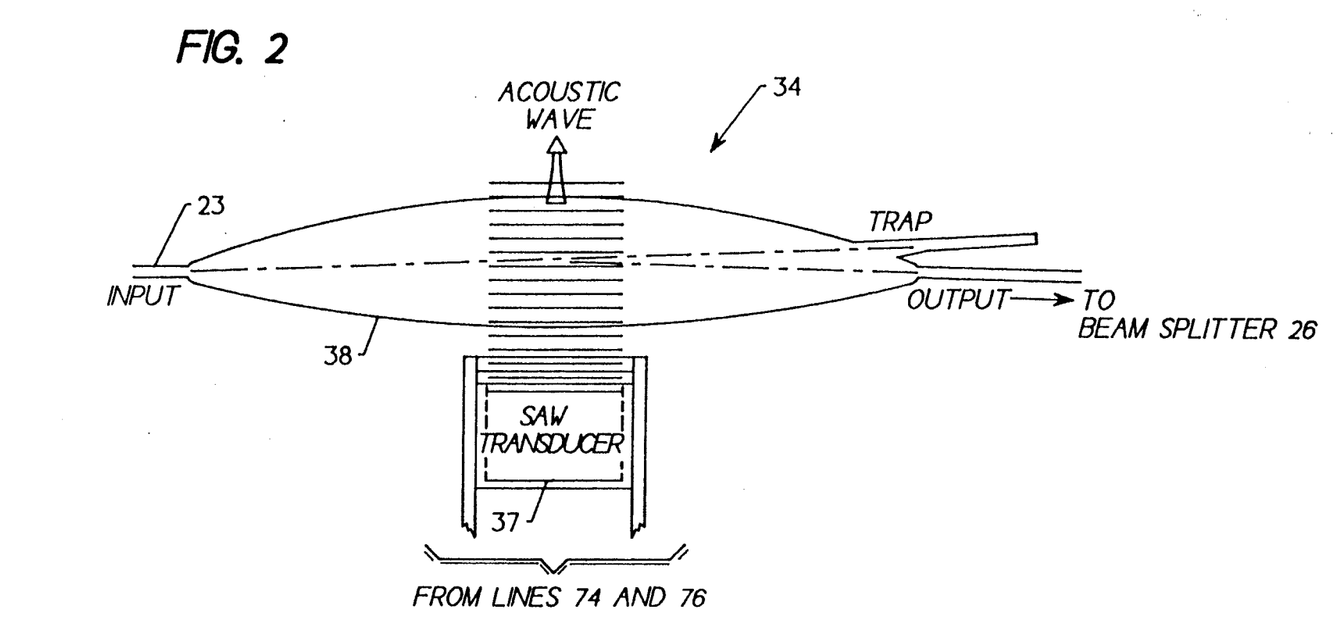
FIG. 2 illustrates the acousto-optical modulator (Bragg cell) utilized in the present invention.

Frequency shifter 34c is preferably an acousto-optic modulator in the form of a Bragg cell, and is shown in FIG. 2. A surface acoustic-wave (SAW) transducer 37 is responsive to an input signal from an external source to generate a surface acoustic wave across the planar surface of waveguide 38 in a direction substantially normal (but offset by the Bragg angle) to the propagation direction through the waveguide 38. The optical signal waveguide 23 interacts with the SAW transducer 37 due to the diffraction-grating-like effect of the periodic variation in refractive index caused by the acoustically-induced strain in the waveguide 38. This interaction generates an output signal that is shifted in frequency by the frequency of the SAW transducer 37, and also in direction, by twice the Bragg scattering angle. This output is coupled to optical beam splitter 26.

Referring again to FIG. 3, VCOs 30 and 32 output RF signals 74 and 76, respectively, which are inputted into the SAW transducer 37. The coherent optical beam outputted by frequency shifter 34c is coupled into beam splitter 26 which splits the coherent optical beam into first and second coherent optical signals. The first and second coherent optical signals are inputted into evanescent coupler 22 via waveguides 92a and 92b respectively. Coupler 22 is optically coupled to waveguide 20 and is configured in such a manner with waveguide 20 that the first and second coherent optical signals are oppositely directed in waveguide 20, i.e., the first coherent optical signal travels in a first direction (clockwise) in waveguide 20 and the second coherent optical signal travels in a second direction (counterclockwise) in waveguide 20.

Evanescent coupler 94, which is optically coupled to waveguide 20, has a first output coupled to waveguide 500a which in turn is coupled to the input of detector 44 and a second output coupled to waveguide 500b, which in turn is coupled to the input of detector 42. Detector 44 receives a portion of the first coherent optical signal travelling in the first direction (clockwise) in waveguide 20, while detector 42 receives a portion of the second coherent optical signal travelling in the second direction (counterclockwise) in waveguide 20. Detector 44 outputs a detection signal 96 which represent the intensity of the first coherent optical signal in waveguide 20, while detector 42 outputs detector signal 95 which represents the intensity of the second coherent optical signal.

Detection signal 95 and modulation signal Fm2 60 are inputted into a demodulation network 43 that includes a phase detector 46 and an integrator 48 (as well as low-pass filtering). Phase detector 46 outputs a DC voltage that is proportional to the difference in phase between the modulation signal Fm2 60 and that component of detector signal 95 which is modulated at Fm2. The DC voltage is then inputted into integrator 48 which outputs demodulation signal 97. Demodulation signal 97 remains constant, when the input into integrator 48 is constant, and is coupled into the input of summing network 56. Summing network 56 outputs control signal 80 which represents the sum of demodulation signal 97 and DC voltage 58. Control signal 80 servos the laser frequency $F_L$ in order to ensure the equality:

$$F_L + F_S = F_{RCCW},$$

where:

$F_L$ is the laser frequency, $F_S$ is frequency bias of the frequency shifter, and $F_{RCCW}$ is the resonant frequency in the counterclockwise direction.

Similarly, detection signal 96 and modulation signal Fm1 62 are inputted into a demodulation network 53 that includes a phase detector 50 and an integrator 52. Phase detector 50 outputs a DC voltage that is proportional to the difference in phase between modulation signal Fm1 62 and that component of detection signal 96 which is modulated at Fm1. The DC voltage is then inputted into integrator 52 which outputs demodulation signal 98. Demodulation signal 98, which remains constant when the input into integrator 52 is constant, is coupled into the input of summing network 38. Summing network 38 outputs control signal 72 which represents the sum of demodulation signal 98 and modulation signal Fm1 62. Control signal 72 modulates and servos VCO 30 such that the output of VCO 30 ensures the equality:

$$F_L + F_S + F_{CT} = F_{RCW},$$

where:

$F_{RCW}$ is the resonant frequency in the CW direction,
$F_L$ is the laser frequency,
$F_S$ is the fixed frequency bias of the shifter, and
$F_{CT}$ represents a frequency correction term.

VCO 32 is not in a feedback loop, therefore its output signal 76 does not experience a change in frequency. However, VCO 32 is constantly modulated by modulation signal Fm2 60. RF signals 74 and 76 are coupled to the inputs of network 54 that provides an output signal 78 that is proportional to the difference in frequency between RF signals 74 and 76. This signal is proportional to the rotation of the waveguide 20. When waveguide 20 is at rest in inertial space, $F_{CT}$ equals zero; when waveguide 20 rotates about an axis normal to the plane of the waveguide 20, $F_{CT}$ is proportional to the rate of turn in accordance with the Sagnac effect.

Figure 7:
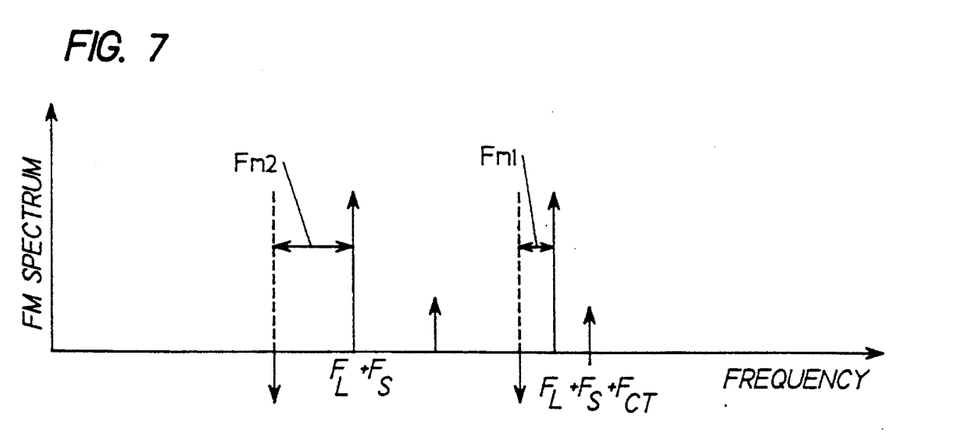
FIG. 7 illustrates the frequency spectrum of the light directed to the waveguide resonator for both of the clockwise (cw) and counterclockwise (ccw) ring excitation.

FIG. 7 shows the frequency spectrum of the light directed to the waveguide resonator 20 for both the clockwise (cw) and counterclockwise (ccw) ring excitation. Two distinct FM spectra exist because of the use of two independent VCOs 30 and 32, each of which has a unique modulation frequency Fm1 and Fm2 respectively. For illustration simplicity, only the first upper and lower sidebands are displayed.

While the splitter 26 does indeed create two coherent optical signals, their frequency spectra are identical. Both modulation frequencies are present on each of these signals, and each signal experiences the effect of both control signals. The splitter 26 thus divides the intensity of the input beam. It is the demodulator circuitry that permits selective frequency tracking. Signal 1 is demodulated at FM1, and signal 2 is demodulated at FM2. As such, it is as if the right portion of the spectrum in FIG. 7 (i.e. that centered about $F_L + F_S + F_{CT}$) were not present on signal 2, and as if the FM spectrum centered about $F_L + F_S$ were not present on signal 1.

Figure 6:
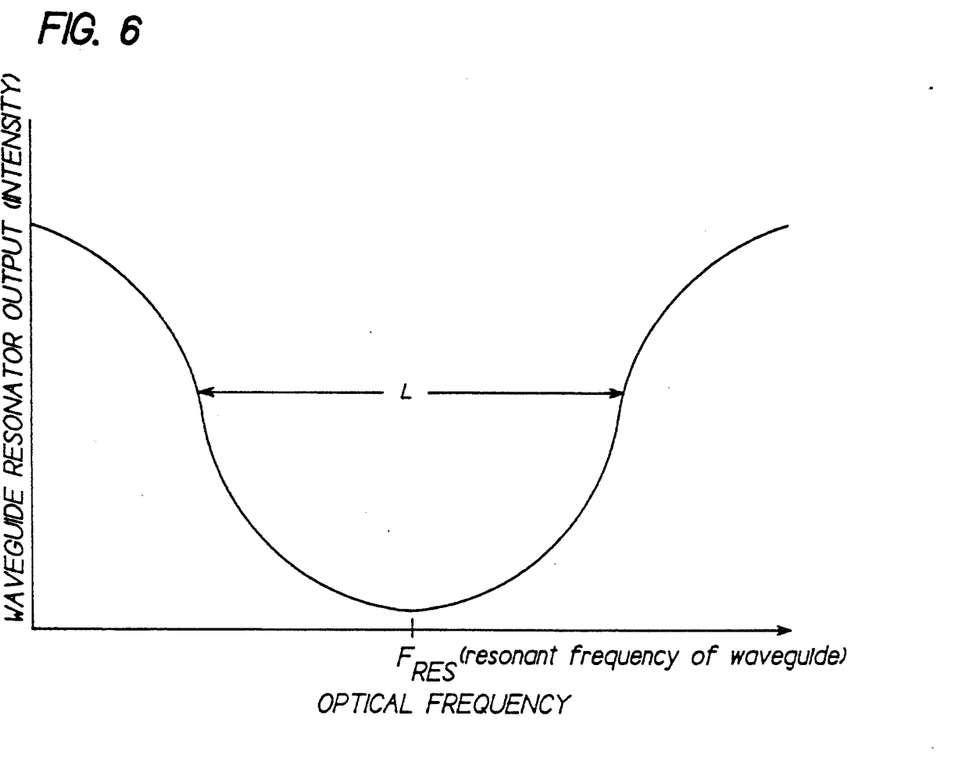
FIG. 6 illustrates the waveguide resonator output (intensity), without modulation, as a function of input optical frequency.

FIG. 6 depicts the waveguide resonator output (intensity), without modulation, as a function of input light frequency. In general, the resonator linewidth (L) will be much broader than the offset between the two spectra of FIG. 7. Each of the detectors 42 and 44 produces frequency components at both modulation frequencies.

Figure 4:
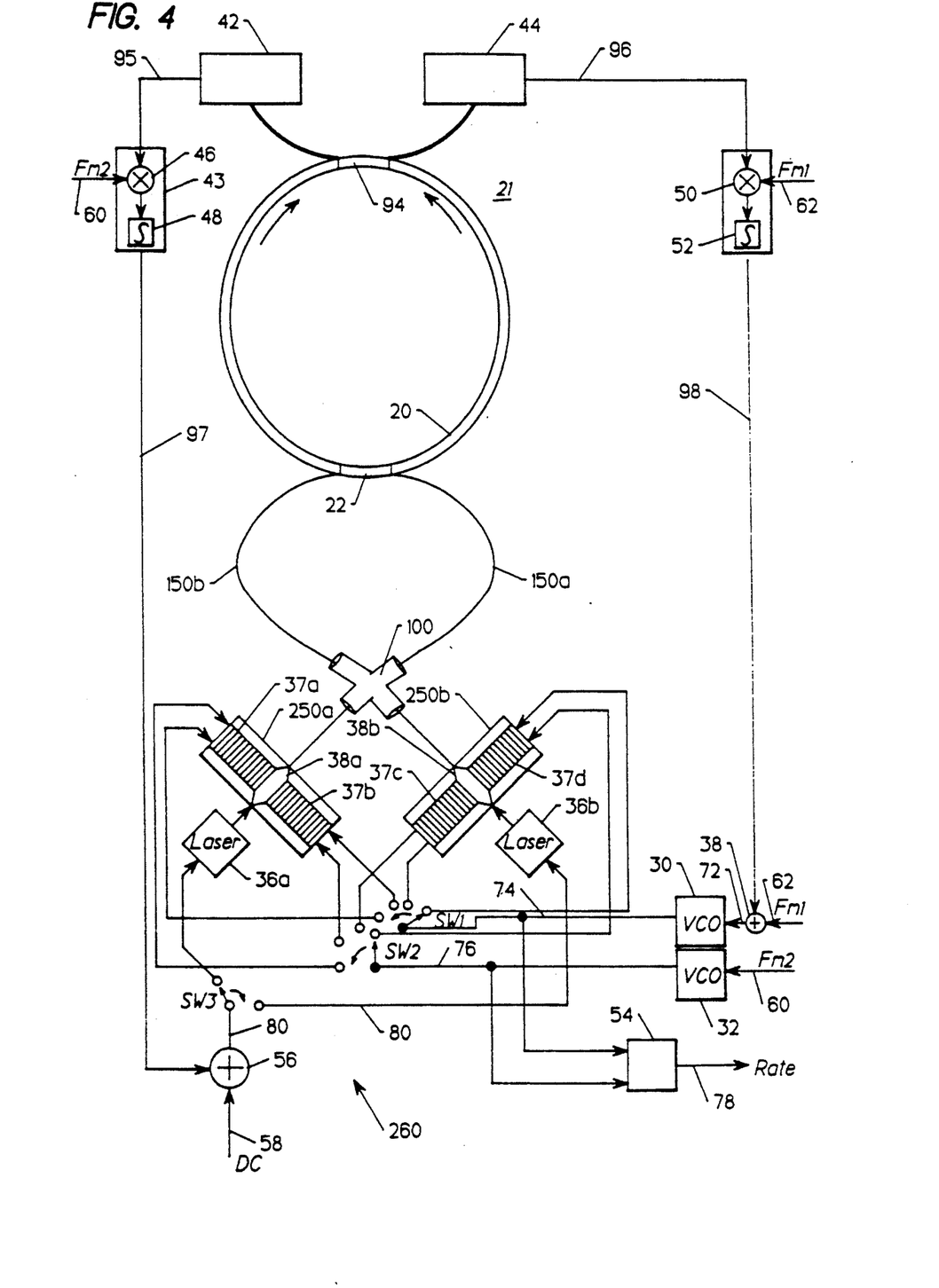
FIG. 4 shows a laser gyro utilizing the single frequency shifter of the present invention and having additional lasers and frequency shifters for purposes of component redundancy.

A further embodiment of the invention reduces complexity in implementing component redundancy and is shown in FIG. 4. Laser gyro 260 utilizes x-branch beam splitter 100 instead of the y-branch beam splitter 26 of FIG. 3. Frequency shifters 250a and 250b are formed by coupling optical waveguides 38a and 38b to each input leg of x-branch beam splitter 100. Surface acoustic wave (SAW) transducer pads 37a-d are deposited on either side of waveguides 38a and 38b. The gyro 260 may be operated via any of the four transducer pads 37a-d as selected by switches SW1, SW2, and SW3. The output signals 74 and 76, of VCOs 30 and 32, respectively, are coupled to inputs of each SAW transducer pad 37a-d. Lasers 36a and 36b are each coupled to an input of waveguides 38a and 38b. This configuration improves the system redundancy thereby enabling the laser gyroscope to continue operating in the event of failure of up to three SAW transducers and a laser.

Figure 5:
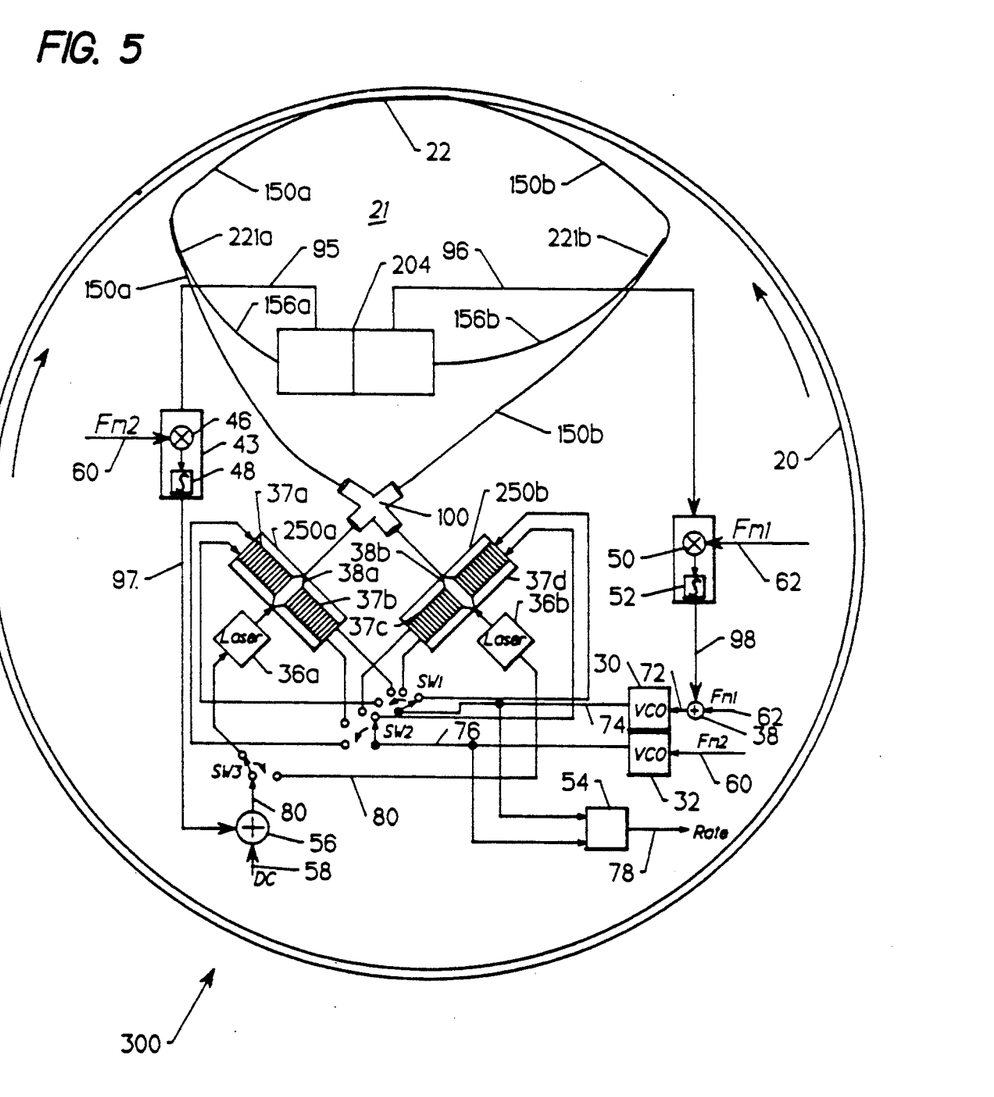
FIG. 5 shows the laser gyro of FIG. 4 situated within the perimeter of the rate-sensing ring waveguide resonator.

A further embodiment of the invention is shown in FIG. 5 which illustrates the gyro configuration FIG. 4, with all components situated within the perimeter of the rate sensing ring waveguide resonator 20. A single Bi-cell detector 204 is utilized instead of separate detectors.

Frequency shifters 250a and 250b are each coupled to an input of x-branch splitter 100. The output signals of x-branch splitter 100 are coupled to waveguide 20 via waveguide 150a and 150b and evanescent coupler 22. Bi-cell detector 204 receives a portion of the first coherent optical signal travelling in the first direction (clockwise) via waveguide 150b and directional coupler 221b and receives a portion of, the second coherent optical signal travelling in a second direction (counterclockwise) via waveguide 150a and directional coupler 221a. Gyro 300 operates via either frequency shifter 250a and laser 36a, or frequency shifter 250b and laser 36b. Frequency shifter 250a operates via either SAW transducer 37a or 37b, while frequency shifter 250b operates via either SAW transducer 37c or 37d.

Based on the foregoing teaching, those having ordinary skill in the art may derive a number of modifications to the embodiments of the invention disclosed above. As such, the invention is not to be construed to be limited only to these disclosed embodiments, but it is instead intended to be limited only as defined by the appended claims.

I claim:

1. A passive ring resonator laser gyroscope comprising:

a thin film waveguide providing a closed, passive propagation path for optical signals;

laser means, responsive to a control input, for generating a coherent light beam;

frequency shifter means having first, second and third inputs and an output, the first input being coupled to the coherent light beam of the laser means, the frequency shifter means shifting a frequency of the coherent light beam in response to signals applied to the second and third inputs;

first signal generating means for generating a first signal having a first frequency and having an input coupled to a first modulation signal and an output, the output being coupled to the second input of the frequency shifter means;

second signal generating means for generating a second signal having a second frequency and having an input coupled to a second modulation signal and an output coupled to the third input of the frequency shifter means;

beam splitting means having an input and two outputs, the input being coupled to the output of the frequency shifter means, the beam splitting means splitting a coherent optical signal emanating from the output of the frequency shifter means into first and second coherent optical signals;

first coupler means for coupling the first and second coherent optical signals into the waveguide, the first coupler means having two inputs and being optically coupled to the waveguide, the first input of the first coupler means being coupled to the first output of the beam splitting means, the second input of the first coupler means being coupled to the second output of the beam splitting means, the first coupler means and the waveguide being configured in such a manner that the first and the second coherent optical signals are oppositely directed in the waveguide; and second coupler means optically coupled to the waveguide and having two outputs, the first output being coupled to an input of a first detector means whereby the first detector means receives a portion of the first coherent optical signal travelling in a first direction in the waveguide, the second output of the second coupler means being coupled to an input of a second detector means whereby the second detector means receives a portion of the second coherent optical signal travelling in a second, opposite direction in the waveguide, the first detector means outputting a first detection signal representative of an intensity of the first coherent optical signal in the waveguide, the second detector means outputting a second detection signal representative of an intensity of the second coherent optical signal in the waveguide.

2. The laser gyroscope as set forth in claim 1 and further including:
a first demodulation network having two inputs and an output, a first input being coupled to the first detection signal, a second input being coupled to a first modulation signal, the first demodulation network outputting a first demodulation signal that is proportional to a difference in phase between that component of the first detection signal, which is at the first modulation frequency, and the first modulation signal; and
a first summing network having two inputs and an output, a first input being coupled to the first demodulation signal and a second input being coupled to the first modulation signal, the output of the first summing network forming a first control signal and being coupled to the input of the first signal generating means.

3. The laser gyroscope as set forth in claim 2 and further including:
a second demodulation network having two inputs and an output, a first input being coupled to the second detection signal, a second input being coupled to the second modulation signal, the second demodulation network outputting a second demodulation signal that is proportional to a difference in phase between that component of the second detection signal, which is at the second modulation frequency, and the second modulation signal; and
a second summing network having two inputs and an output, a first input being coupled to the second demodulation signal and a second input being coupled to a current bias, the second summing network outputting a second control signal that is coupled to the control input of the laser.

4. The laser gyroscope as set forth in claim 1 further including a frequency comparison means having two inputs and an output, a first input being coupled to the output of the first signal generating means, a second input being coupled to the output of the second signal generating means, the frequency comparison means generating at an output a rate signal representative of a difference in frequency between the output signal of the first and second signal generating means, whereby the rate signal is representative of an angular rate of the waveguide.

5. The laser gyroscope as set forth in claim 1 wherein the frequency shifter means includes an acousto-optical modulator.

6. The laser gyroscope as set forth in claim 1 wherein the first and second signals generated by the first and the second signal generator means, respectively, are radio frequency signals.

7. A passive ring resonator laser gyroscope, comprising:
a thin film waveguide providing a closed, passive propagation path for optical signals;
means for coupling first and second coherent optical signals into the waveguide, the first and second coherent optical signals being oppositely directed in the waveguide;
means for generating a first control signal representative of an intensity of the first coherent optical signal in the waveguide and a first modulation signal;
means for generating a reference signal representative of a second modulation signal;
means for generating a second control signal representative of an intensity of the second coherent optical signal in the waveguide and a second modulation signal; and,
frequency control means including a plurality of frequency shifters, each of the plurality of frequency shifters shifting the frequencies of the first and second coherent optical signals in response to the first control signal and to the reference signal, the frequencies of the first and second coherent optical signals being responsive to the second control signal and to a dc bias, the plurality of frequency shifters providing component redundancy such that the laser gyroscope continues to operate so long as at least one of the frequency shifters is operational.

8. The laser gyroscope as set forth in claim 7 and further comprising means for generating a rate signal representative of a difference in frequency between the first control signal and the reference signal, the rate signal being representative of an angular rate of the waveguide.

9. The laser gyroscope as set forth in claim 7 and further including:
a plurality of lasers each of which generates a coherent light beam into one of the operational frequency shifters; and
beam splitting means for splitting the coherent light beam from each operational frequency shifter into the first and second coherent optical signals, wherein
each of the plurality of operational frequency shifters shifts the frequency in response to a first control signal, and wherein the frequency of the coherent light beam outputted from each of the plurality of lasers is responsive to a second control signal applied to a control input of each of the plurality of lasers.

10. The laser gyroscope as set forth in claim 7 wherein each of the plurality of frequency shifters includes an acousto-optical modulator that is disposed external to each of the plurality of lasers.

11. The laser gyroscope as set forth in claim 9 wherein the waveguide is a thin film ring waveguide and the plurality of frequency shifters, the plurality of lasers, the coupling means, the beam splitting means, and the rate signal generating means are located within a perimeter of the thin film ring waveguide.

12. A passive ring resonator laser gyroscope, comprising:
a circular thin film waveguide providing a closed, passive propagation path for optical signals;
laser means for generating a coherent light beam;
frequency shifting means, coupled to the laser means, for shifting a frequency of the coherent light beam in response to a first control signal and to a reference signal, the frequency shifting means being a single frequency shifter;

beam splitting mean, coupled to the frequency shifting means, for splitting the coherent light beam into first and second coherent optical signals, the frequency of the coherent light beam and frequencies of the first and second coherent optical signals being identical;

coupling means, coupled to the beam splitting means and to the waveguide, for coupling the first and second coherent optical signals into the waveguide, the first and second coherent optical signals being oppositely directed in the waveguide;

first detector means, coupled to the waveguide, for generating a first detection signal representative of an intensity of the first coherent optical signal in the waveguide;

second detector means, coupled to the waveguide, for generating a second detection signal representative of an intensity of the second coherent optical signal in the waveguide;

means, coupled to the first detector means and the frequency shifting means, for generating the first control signal, the first control signal being representative of the first detection signal and a first modulation signal;

means, coupled to the frequency shifting means, for generating the reference signal, the reference signal being representative of a second modulation signal;

means, coupled to the second detector means and to the laser means, for generating a second control signal, the second control signal being representative of the second modulation signal and a dc bias signal, the frequency of the coherent light beam being responsive to the second control signal; and, means, coupled to the means for generating the first control signal and to the means for generating the reference signal, for generating a rate signal, the rate signal being representative of a difference in frequency between the first control signal and the reference signal, the rate signal being further representative of an angular rotation rate of the waveguide.

13. The laser gyroscope as set forth in claim 12, wherein the single frequency shifter is an acousto-optical modulator disposed external to the laser means.

14. The laser gyroscope as set for the in claim 12, wherein:
the means for generating the first control signal comprises a first demodulation network responsive to the first detection signal and to the first modulation signal and outputting a first demodulation signal,
the first demodulation signal being representative of a difference in phase between the first modulation signal and a component of the first detection signal which is modulated at a frequency of the first modulation signal.

15. The laser gyroscope as set forth in claim 14, wherein:
the means for generating the first control signal further comprises a first summing network responsive to the first demodulation signal and to the first modulation signal,
the first summing network outputting an output signal representative of the sum of the of the first demodulation signal and the first modulation signal.

16. The laser gyroscope as set forth in claim 15, wherein:
the means for generating the first control signal further comprises a first oscillator responsive to the output signal, whereby a zero'th order term in an FM spectrum of the first and second coherent optical signals in the waveguide at the frequency of the first modulation signal is adjusted to clockwise resonance, the first oscillator outputting the control signal.

17. The laser gyroscope as set forth in claim 16, wherein the first demodulation network comprises:
a first phase detector responsive to the first detection signal and to the first modulation signal and outputting a first dc voltage signal that is representative of the difference in phase between the first modulation signal and the component of the first detection signal which is modulated at the frequency of the first modulation signal; and,
a first integrator responsive to the first dc voltage signal and outputting the first demodulation signal.

18. The laser gyroscope as set forth in claim 12, wherein the means for generating the reference signal comprises a reference oscillator responsive to the second modulation signal and outputting the reference signal.

19. The laser gyroscope as set forth in claim 12, wherein:
the means for generating the second control signal comprises a second demodulation network responsive to the second detection signal and to the second modulation signal and outputting a second demodulation signal,
the second demodulation signal being representative of a difference in phase between the second modulation signal and a component of the second detection signal which is modulated at a frequency of the second modulation signal.

20. The laser gyroscope as set forth in claim 19, wherein the means for generating the second control signal further comprises a second summing network responsive to the second demodulation signal and to the dc bias signal and outputting the second control signal.

21. The laser gyroscope as set for the in claim 20, wherein the second demodulation network comprises:
a second phase detector responsive to the second detection signal and to the second modulation signal and outputting a second dc voltage signal that is representative of the difference in phase between the second modulation signal and the component of the second detection signal which is modulated at the frequency of the second modulation signal; and,
a second integrator responsive to the second dc voltage signal and outputting the second demodulation signal.

22. A passive ring resonator laser gyroscope, comprising:
a circular waveguide;
a laser for generating a coherent light beam;
frequency shifting means coupled to the laser for shifting a frequency of the coherent light beam in response to a first control signal and a reference signal;
beam splitting means coupled to the frequency shifting means for splitting the coherent light beam into first and second coherent optical signals;
coupling means coupled to the beam splitting means and the waveguide for coupling the first and second coherent optical signals into the waveguide in opposing directions;

a first detector means coupled to the waveguide for generating a first detection signal representative of an intensity of the first coherent optical signal in the waveguide;

a second detector means coupled to the waveguide for generating a second detection signal representative of an intensity of the second coherent optical signal in the waveguide;

means coupled to the first detector means and to the frequency shifting means for generating the first control signal in response to the first detection signal and a first modulation signal;

means coupled to the frequency shifting means for generating the reference signal in response to a second modulation signal;

means coupled to the second detector means and to the laser means for controlling a frequency of the coherent light beam in response to the second detection signal and to the second modulation signal; and, means coupled to the means for generating the first control signal and the means for generating the reference signal for generating a rate signal representative of the first control signal and the reference signal.

* * * * *